United States Patent
Chang

(10) Patent No.: US 7,604,365 B2
(45) Date of Patent: Oct. 20, 2009

(54) DIRECT TYPE BACKLIGHT MODULE HAVING REFLECTIVE SHEET SUPPORTED BY SUPPORTING MEMBER

(75) Inventor: Shao-Han Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 200 days.

(21) Appl. No.: 11/697,306

(22) Filed: Apr. 6, 2007

(65) Prior Publication Data

US 2008/0094830 A1    Apr. 24, 2008

(30) Foreign Application Priority Data

Oct. 20, 2006    (CN) .................... 2006 1 0201015

(51) Int. Cl.
*F21V 7/00* (2006.01)
(52) U.S. Cl. ............ 362/97.1; 362/249.01; 362/249.02; 362/241; 362/247
(58) Field of Classification Search ............... 362/225, 362/235–237, 240–241, 247, 249, 97.1, 97.3, 362/97.4, 249.01, 249.02, 238
See application file for complete search history.

(56) References Cited

U.S. PATENT DOCUMENTS

| 6,974,221 | B2 * | 12/2005 | Wu et al. .................. 362/29 |
| 7,204,604 | B2 * | 4/2007 | Chou ...................... 362/227 |
| 7,324,174 | B2 * | 1/2008 | Hafuka et al. ............. 349/61 |
| 2006/0158905 | A1 * | 7/2006 | Lai et al. ................ 362/634 |

\* cited by examiner

*Primary Examiner*—Thomas M Sember
(74) *Attorney, Agent, or Firm*—Frank R. Niranjan

(57) ABSTRACT

An exemplary direct type backlight module (30) includes a housing (31), a reflective sheet (34), a central supporting member (36), and a plurality of light sources (33). The housing includes a base plate (311) and a periphery side plate (313) extending from the base plate. The supporting member is disposed on the base plate and supports the reflective sheet. The reflective sheet defining a plurality of through holes. The light sources are arranged on or above the base plate. Each of the light sources includes a light emitting portion (331) extending through a corresponding one of the through holes of the reflective sheet.

6 Claims, 8 Drawing Sheets

DIRECT TYPE BACKLIGHT MODULE HAVING REFLECTIVE SHEET SUPPORTED BY SUPPORTING MEMBER

BACKGROUND OF THE INVENTION

1. Field of the Invention

The present invention generally relates to backlight modules, and, particularly, to a direct type backlight module for use in, for example, a liquid crystal display (LCD).

2. Discussion of the Related Art

In recent years, various LCDs have gained popular widespread use. The lightness and slimness of LCD panels make them advantageous for use in a wide variety of electronic devices such as personal digital assistants (PDAs), mobile phones, portable personal computers, and other electronic appliances. In an LCD panel, liquid crystal is a substance that cannot by itself emit light. Rather, the liquid crystal relies on receiving light from a light source in order to display images and data. In the case of a typical LCD panel, a backlight module powered by electricity supplies the needed light.

Referring to FIG. 8, a typical direct type backlight module 10 is shown. The backlight module 10 includes a housing 11, a reflective sheet 14, an optical plate 15, and a plurality of point light sources 13. The housing 11 includes a base plate 111, and a peripheral side plate 113 extending up from an edge of the base plate 111.

The point light sources 13 are located on the base plate 111 of the housing 11 in a predetermined arrangement. Each of the point light sources 13 includes a light emitting portion 131. The light emitting portion 131 is made of transparent plastic material. The reflective sheet 14 is disposed in a lower portion of the housing 11. The optical plate 15 is disposed on top of the housing 11, and is supported on the side plate 113. The reflective sheet 14 defines a plurality of through holes (not labeled). The light emitting portions 131 of the point light sources 13 extend through the corresponding through holes of the reflective sheet 14 and protrude above the reflective sheet 14.

Typically, the reflective sheet 14 is substantially a thin plastic piece. Thus, a metal sheet 16 is provided below the reflective sheet 14 for supporting the reflective sheet 14. However, the metal sheet 16 increases a weight and a cost of the backlight module 10. In addition, in order that the point light sources 13 are properly engaged in position, a plurality of assembling holes (not labeled) are defined in the metal sheet 16. In assembly of the backlight module 10, the light emitting portions 131 are easily scraped by edges of the metal sheet 16 that surround the assembling holes. The assembly process must be performed accurately and carefully, and tends to be problematic. Furthermore, the metal sheet 16 is typically only a thin sheet, and is liable to easily deform. Moreover, once the metal sheet 16 becomes deformed, it is difficult to recover the metal sheet 16 to its original shape.

Therefore, a new backlight module is desired in order to overcome the above-described shortcomings.

SUMMARY

In one embodiment, a direct type backlight module includes a housing, a reflective sheet, a central supporting member, and a plurality of light sources. The housing includes a base plate and a periphery side plate extending from the base plate. The supporting member is disposed on or above the base plate and supports the reflective sheet. The reflective sheet defining a plurality of through holes. The light sources are arranged on the base plate. Each of the light sources includes a light emitting portion extending through a corresponding one of the through holes of the reflective sheet.

Other novel features and advantages will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present direct type backlight module. Moreover, in the drawings, like reference numerals designate corresponding parts throughout the several views, and all the views are schematic.

DETAILED DESCRIPTION OF THE EMBODIMENTS

Figure 1:
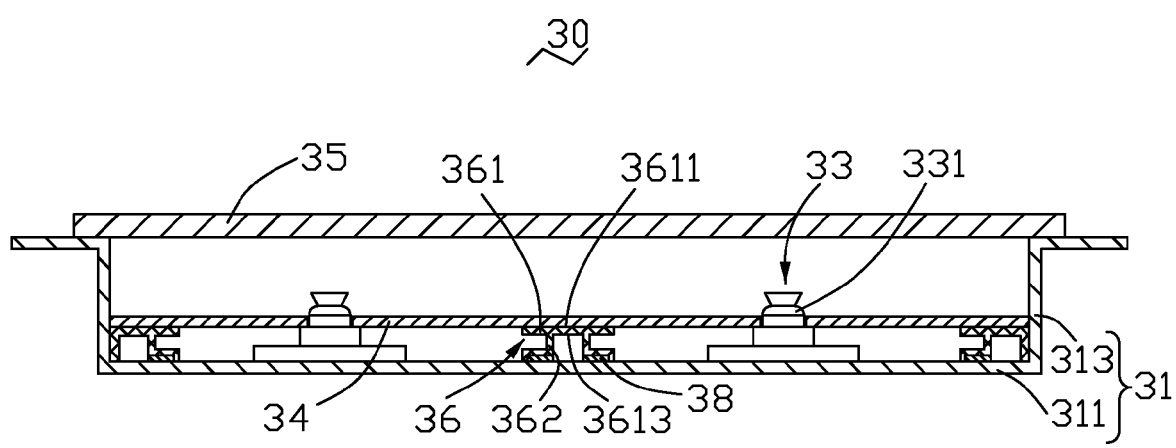
FIG. 1 is essentially a side cross-sectional view of a direct type backlight module in accordance with a first embodiment of the present invention.
Figure 2:
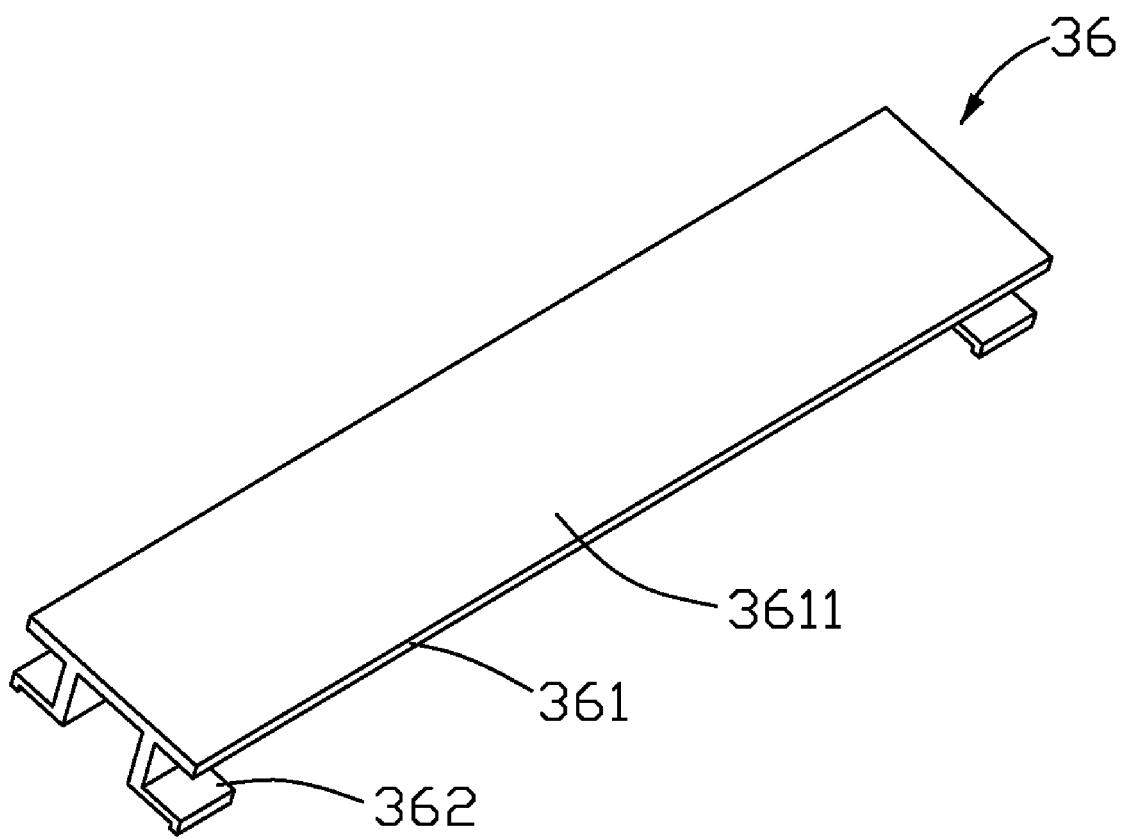
FIG. 2 is an enlarged, isometric view of a supporting member of the backlight module of FIG. 1.

Referring now to the drawings in detail, FIGS. 1-2 show aspects of a direct type backlight module 30 according to a first embodiment. The backlight module 30 includes a housing 31, a reflective sheet 34, an optical sheet 35, a plurality of light sources 33, and a plurality of supporting members. A central one of the supporting members is designated with the numeral 36.

The housing 31 includes a base plate 311, and a peripheral side plate 313 extending up from an edge of the base plate 311. The light sources 33 are located on the base plate 311 of the housing 31 in a predetermined arrangement. Each of the light sources 33 includes a light emitting portion 331. In the illustrated embodiment, the light sources 33 are point light sources such as light emitting diodes (LEDs). The light emitting portion 331 is made of transparent plastic material. The reflective sheet 34 is disposed in a lower portion of the housing 31. The optical plate 35 is disposed on top of the housing 31, and is supported on the side plate 313. The reflective sheet 34 defines a plurality of through holes (not labeled) according to the predetermined arrangement. Thus the light emitting portions 331 of the light sources 33 extend through the through holes and protrude above the reflective sheet 34.

The supporting members are configured for supporting the reflective sheet 34. The supporting members are located on the base plate 311 of the housing 31 in a predetermined arrangement according to the positions of the light sources 33. It should be understood that the supporting members can have the same shape, or similar shapes, or substantially different shapes. In the illustrated embodiment, the central supporting member 36 is configured slightly differently from two other lateral supporting members (not labeled). For the sake of convenience, only the central supporting member 36 is described in detail below. The supporting member 36 includes a platform 361 and a platform support 362. The platform 361 is substantially long and flat. The platform 361 includes a top surface 3611 that abuts and supports the reflective sheet 34, and a bottom surface 3613 opposite from the top surface 3611. The platform support 362 perpendicularly extends from the bottom surface 3613 of the platform 361. The platform support 362 includes two parallel beam portions extending down from the bottom surface 3613, and two pairs of end portions extending from the beam portions. Each pair of end portions is located at a respective one of opposite ends of the platform support 362. Each end portion comprises a horizontal part extending from the respective beam portion, and a vertical part extending from the horizontal part. A bottom of the vertical part is supported on the base plate 311. Thus a gap exists between the horizontal part and the base plate 311. Each of the end portions is fixed to the base plate 311 of the housing 31 with a fixing member 38, which is received in the corresponding gap. The fixing member 38 can for example be double-sided adhesive tape, solid adhesive, or cured glue. In order to prevent the reflective sheet 34 from moving, a fixing member (not shown) can also be provided on the top surface 3611 of the platform support 362. The fixing member (not shown) can for example be double-sided adhesive tape, solid adhesive, or cured glue.

Light beams emitted from the light sources 33 transmit directly to the optical sheet 35, or indirectly after being reflected by the reflective sheet 34. The optical sheet 35 diffuses the light beams, which then transmit to an LCD panel (not shown) above the optical sheet 35.

In the above-described backlight module 30, the reflective sheet 34 is supported by the platform 361 of the supporting member 36 and by platforms of the lateral supporting members (not labeled). Unlike in a conventional backlight module, there is no need for a supporting metal sheet. Thereby, a weight and a cost of the backlight module 30 are reduced. In addition, unlike in a conventional backlight module, there is no risk of the light emitting portions 331 being scraped by edges of a metal sheet having assembling holes. Thus assembly of the backlight module 30 is relatively speedy and trouble-free.

Figure 3:
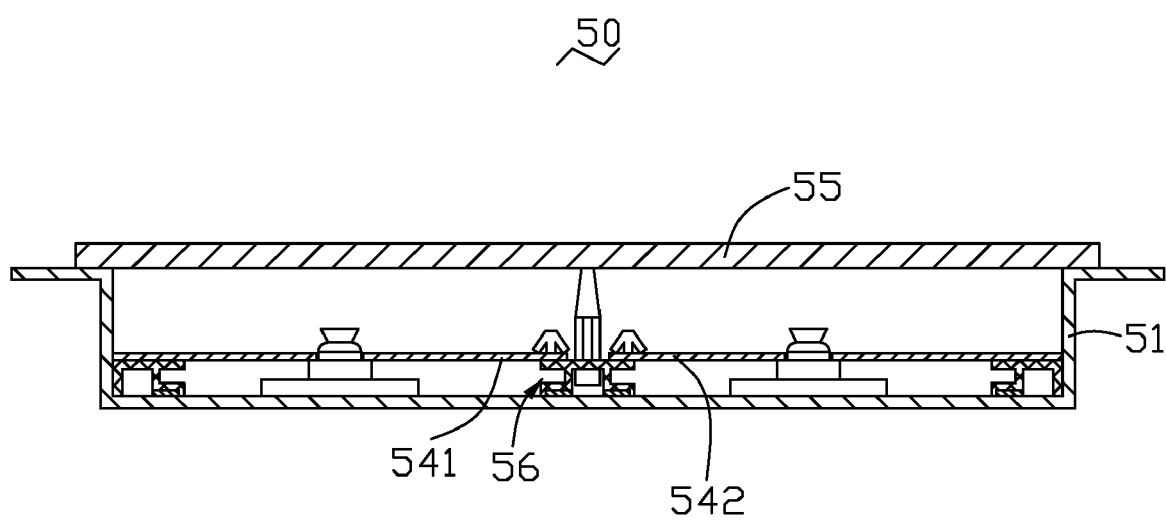
FIG. 3 is essentially a side cross-sectional view of a direct type backlight module in accordance with a second embodiment of the present invention.
Figure 4:
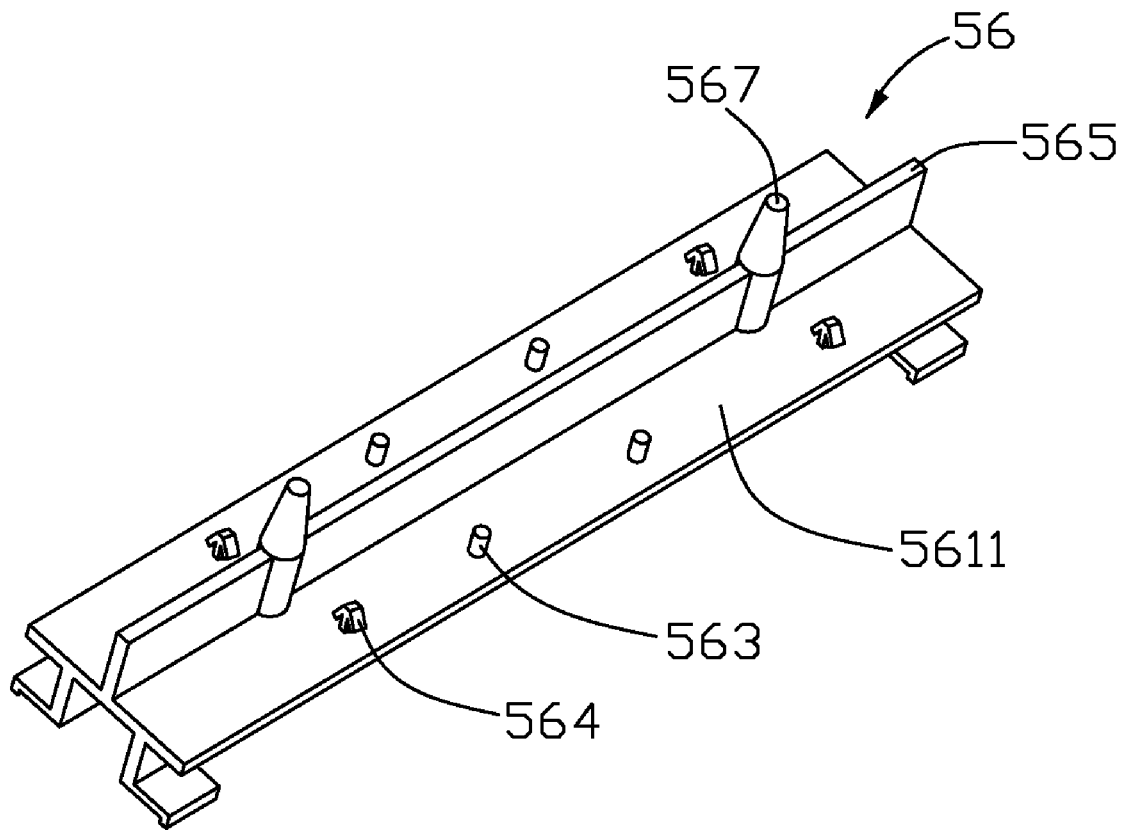
FIG. 4 is an enlarged, isometric view of a supporting member of the backlight module of FIG. 3.

Referring to FIGS. 3-4, aspects of a direct type backlight module 50 according to a second embodiment are shown. The backlight module 50 is similar in principle to the backlight module 30 described above. However, the backlight module 50 includes a housing 51, an optical plate 55, a central supporting member 56, and two reflective sheets 541 and 542. In the illustrated embodiment, the supporting member 56 is located generally between the reflective sheets 541 and 542. The supporting member 56 includes a reflective partition board 565, a plurality of locating posts 563, and a plurality of hooks 564.

The reflective partition board 565 extends perpendicularly up from a middle portion of a top surface 5611 of the supporting member 56. The reflective partition board 565 is typically made of a plastic material having a high reflective ratio. In an alternative embodiment, the reflective partition board 565 can instead be made of a resin material having a plurality of reflective particles dispersed therein. The reflective particles can, for example, be ink particles. The reflective partition board 565 is located between and is closely adjacent to the reflective sheets 541 and 542. In the illustrated embodiment, the reflective partition board 565 separates at least two light sources (not labeled). With this configuration, a total reflective area provided by the housing 51 for reflection of light beams near the light sources is increased. Thereby, a uniformity of light beams emitted from the backlight module 50 can be improved.

The locating posts 563 and the hooks 564 extend perpendicularly up from the top surface 5611 of the supporting member 56, adjacent to the reflective partition board 565. The reflective sheets 541 and 542 define a plurality of locating holes (not labeled) corresponding to the locating posts 563, and a plurality of hooks holes (not labeled) corresponding to the hooks 564. The locating posts 563 are configured for extending through the locating holes of the reflective sheets 541 and 542 so that the reflective sheets 541 and 542 are easily located relative to the supporting member 56. The hooks 564 are configured for extending though the hook holes of the reflective sheets 541 and 542 and being snappingly engaged therein. Thereby, the reflective sheets 541 and 542 are securely fixed to the top surface 5611 of the supporting member 56.

The supporting member 56 can also include a plurality of supporting columns 567 extending from the top surface 5611. The supporting columns 567 are configured for supporting the optical sheet 35, so that the optical sheet 35 is not easily deformed by the effects of gravity, shock or vibration. In illustrated embodiment, the backlight module 50 also includes two lateral supporting members (not labeled) in addition to the supporting member 56. The lateral supporting members are similar to the lateral supporting members of the backlight module 30, and are configured for supporting the reflective sheets 541 and 542 in much the same way as the supporting member 56. In one alternative embodiment, the reflective partition board 565 can be omitted. In other alternative embodiments, there may be only a single locating post 563 for each reflective sheet 541, 542, and/or only a single hook 564 for each reflective sheet 541, 542. In such cases, each reflective sheet 541, 542 correspondingly defines only a single locating hole and/or only a single hook hole.

Figure 5:
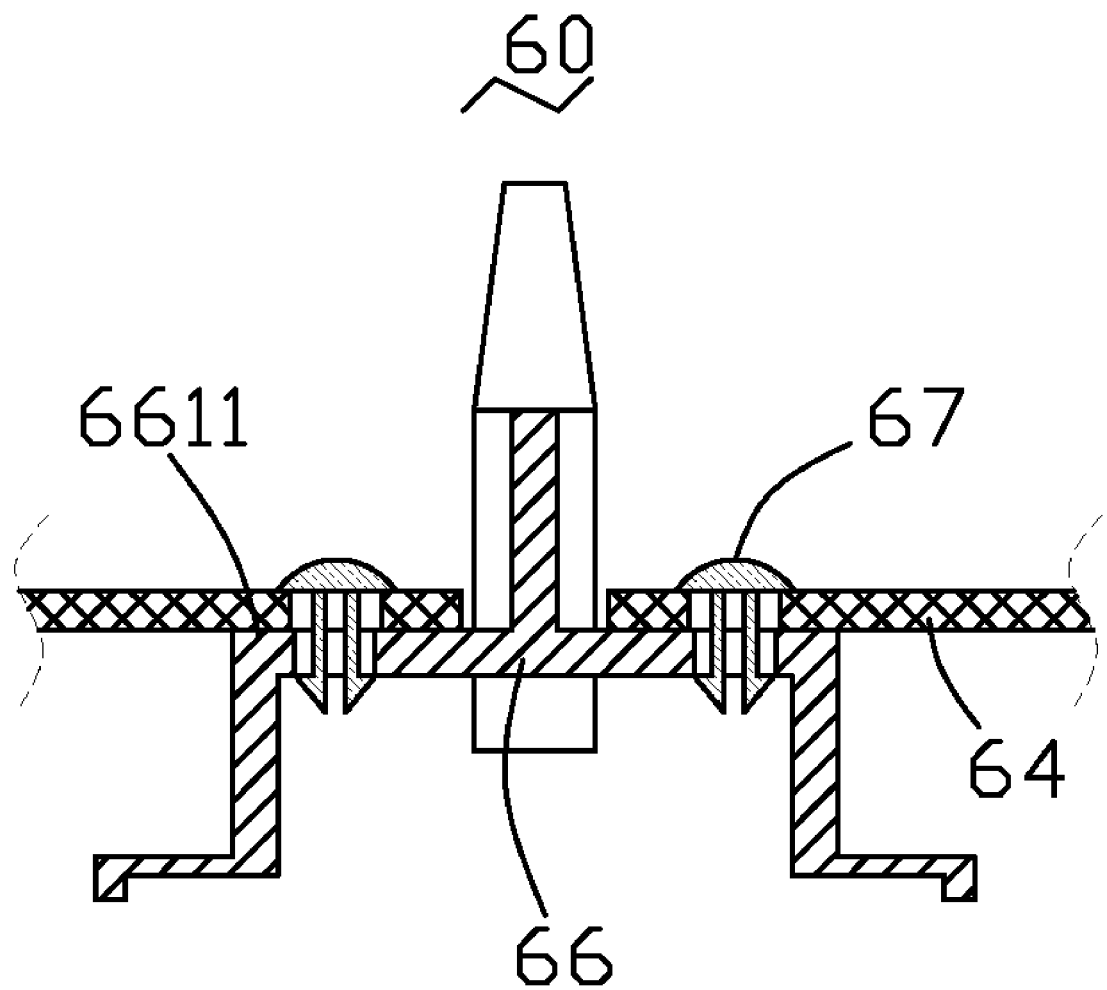
FIG. 5 is a side, cross-sectional view of part of a direct type backlight module in accordance with a third embodiment of the present invention, showing a supporting member thereof.

Referring to FIG. 5, part of a direct type backlight module 60 according to a third embodiment is shown. The backlight module 60 is similar in principle to the backlight module 50 described above. However, the backlight module 60 includes a supporting member 66 and two reflective sheets 64. The supporting member 56 is configured for supporting the reflective sheets 64. The supporting member 66 defines a plurality of first pin holes (not labeled) (instead of having locating posts and hooks), and each of the reflective sheets 64 defines a plurality of second pin holes (not labeled) corresponding to the first pin holes. In assembly, a plurality of pins 67 are snappingly engaged in the first pin holes and the second pin holes. Thereby, the reflective sheets 64 are fixed on a top surface 6611 of the supporting member 66.

Figure 6:
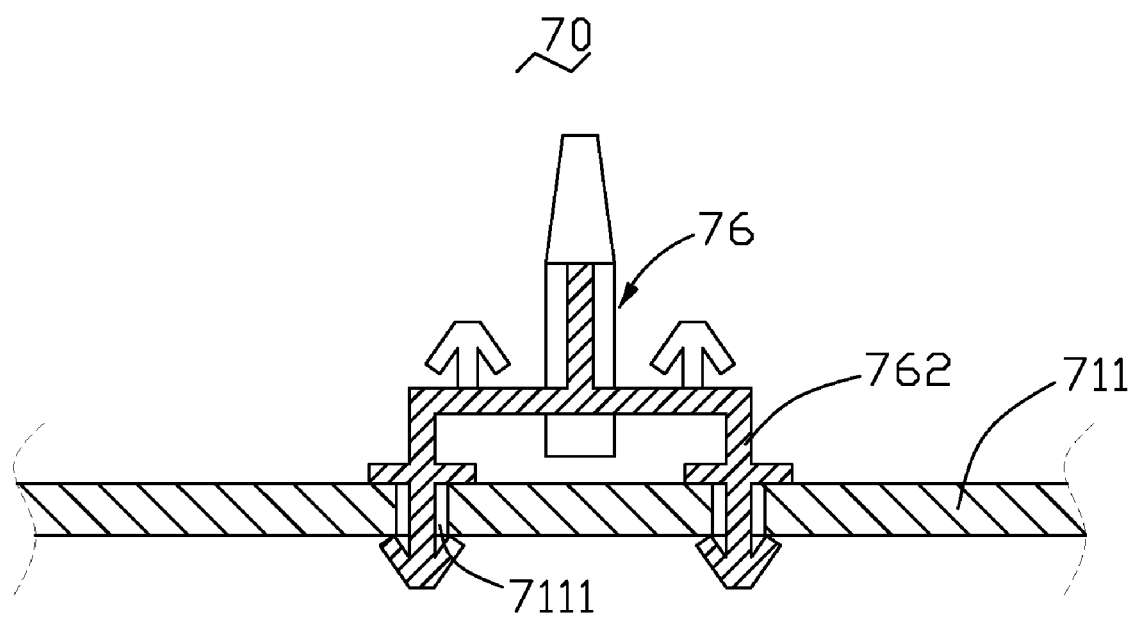
FIG. 6 is a side, cross-sectional view of part of a direct type backlight module in accordance with a fourth embodiment of the present invention, showing a supporting member thereof.

Referring to FIG. 6, part of a direct type backlight module 70 according to a fourth embodiment is shown. The backlight module 70 is similar in principle to the backlight module 50 described above. However, the backlight module 70 includes a base plate 711 and a supporting member 76. The base plate 711 defines a plurality of latching holes 7111. The supporting member 76 includes a plurality of latching claws 762 extending from a bottom surface of a platform (not labeled) thereof. In assembly, the latching claws 762 snappingly engage in the latching holes 7111 of the base plate 711. Thereby, the supporting member 76 is securely fixed to the base plate 711.

Figure 7:
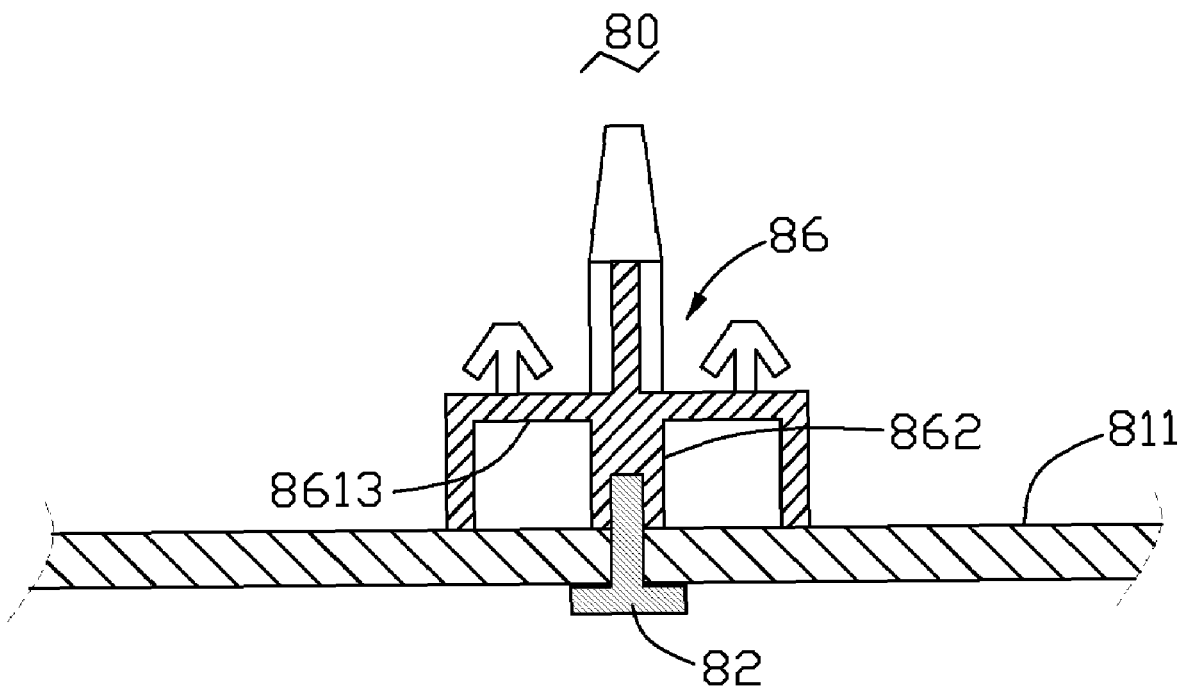
FIG. 7 is a side, cross-sectional view of part of a direct type backlight module in accordance with a fifth embodiment of the present invention, showing a supporting member thereof.
Figure 8:
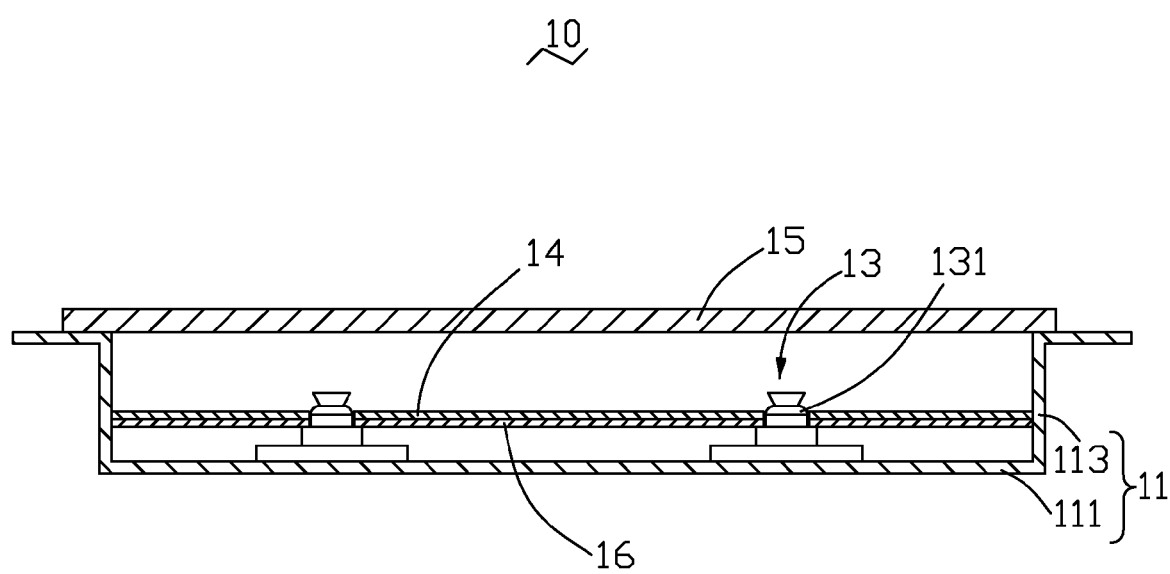
FIG. 8 is essentially a side cutaway view of a conventional direct type backlight module.

Referring to FIG. 7, part of a direct type backlight module 80 according to a fifth embodiment is shown. The backlight module 80 is similar in principle to the backlight module 70 described above. However, the backlight module 80 includes a base plate 811, a supporting member 86, and a bolt 82. The supporting member 86 includes a fixing portion 862 extending from a bottom surface 8613 of a platform (not labeled) thereof. The fixing portion 862 defines a threaded hole (not labeled) in a bottom end thereof. The base plate 811 defines a fixing hole (not labeled) therein. In assembly, the bolt 82 is extended through the fixing hole and threadingly engaged in the threaded hole. Thereby, the supporting member 86 is securely fixed to the base plate 811.

In alternative embodiments, the reflective sheets can be attached to the supporting member by other fixing means as would be known to those skilled in the art. Similarly, the supporting member can be attached to the base plate by other fixing means as would be known to those skilled in the art. For example, another kind of fastener besides the bolt 82 can be employed. More than one optical plate can be disposed on top of the housing 31.

In the above-described backlight modules 30, 50, 60, 70, 80, the supporting member 36, 56, 66, 76, 86 provides a relatively small, simple support for the reflective sheets. Thereby, a weight and a cost of the backlight module 30, 50, 60, 70, 80 are reduced. In addition, the supporting member 36, 56, 66, 76, 86 provides simple fixing means for securely attaching the reflective sheets thereto. Therefore the backlight module 30, 50, 60, 70, 80 can reliably provide good, uniform light emission performance.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A direct type backlight module, comprising:
    a housing having a base plate and a peripheral side plate extending from the base plate;
    two reflective sheets, and each reflective sheet defining a plurality of through holes;
    a supporting member positioned between the reflective sheets, the supporting member comprising a platform and a platform support, the platform including a top surface supporting the reflective sheets and a bottom surface opposite to the top surface, and the platform support extending from the bottom surface of the platform and fixed to the base plate of the housing;
    a plurality of light sources arranged on or above the base plate, each of the light sources including a light emitting portion extending through a corresponding one of the through holes of the reflective sheets; and
    an optical sheet arranged on the side plate above the light sources, wherein the supporting member further comprises a supporting column extending from the top surface of the supporting member, and the supporting column supports the optical sheet;
    wherein the supporting member comprises at least one hook extending from the top surface thereof, each reflective sheet defines at least one hook hole engagingly receiving the at least one hook such that each reflective sheet is fixed to the supporting member.

2. The direct type backlight module as claimed in claim 1, wherein the reflective sheets are fixed to the supporting member by one of double-sided adhesive tape, solid adhesive, or cured glue.

3. The direct type backlight module as claimed in claim 1, wherein the platform support comprises two parallel beam portions extending from the bottom surface and two pairs of end portions, and each pair of end portions extends from a respective end of the platform support and is fixed to the base plate of the housing.

4. The direct type backlight module as claimed in claim 1, wherein each reflective sheet defines a plurality of locating holes therein, and the supporting member includes a plurality of locating posts extending from the top surface thereof and engaging in the a plurality of locating holes.

5. The direct type backlight module as claimed in claim 1, wherein the supporting member further comprises a reflective partition board extending up from the top surface of the supporting member; the two reflective sheets are on opposite sides of the reflective partition board.

6. The direct type backlight module as claimed in claim 1, wherein the light sources are light emitting diodes (LEDs).

* * * * *